United States Patent
Awazu et al.

(10) Patent No.: US 10,216,021 B2
(45) Date of Patent: Feb. 26, 2019

(54) DISPLAY DEVICE

(71) Applicant: Panasonic Liquid Crystal Display Co., Ltd., Himeji-shi, Hyogo (JP)

(72) Inventors: Katsuyuki Awazu, Kanagawa (JP); Hidenori Kikuchi, Hyogo (JP); Hiroaki Sato, Kanagawa (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 15/453,619

(22) Filed: Mar. 8, 2017

(65) Prior Publication Data

US 2017/0176807 A1   Jun. 22, 2017

Related U.S. Application Data

(63) Continuation of application No. PCT/JP2014/005454, filed on Oct. 28, 2014.

(51) Int. Cl.
*G06F 1/16* (2006.01)
*G02F 1/1333* (2006.01)

(52) U.S. Cl.
CPC ........... *G02F 1/133308* (2013.01); *G02F 2001/13332* (2013.01); *G02F 2001/133314* (2013.01); *G02F 2001/133317* (2013.01); *G02F 2001/133322* (2013.01)

(58) Field of Classification Search
CPC ................................. G02F 1/133512
USPC ..................................... 361/679.21
See application file for complete search history.

(56) References Cited

U.S. PATENT DOCUMENTS

| 5,889,623 | A | 3/1999 | Ueda et al. |
| 6,353,465 | B1 | 3/2002 | Hashimoto et al. |
| 2008/0060244 | A1* | 3/2008 | Yang ............ G06F 1/1601 40/716 |
| 2008/0239197 | A1 | 10/2008 | Kasuga |
| 2009/0051845 | A1 | 2/2009 | Tsuchiyama |
| 2009/0190062 | A1 | 7/2009 | Sudo |
| 2011/0249453 | A1 | 10/2011 | Okitsu |

FOREIGN PATENT DOCUMENTS

| JP | 10-068932 | 3/1998 |
| JP | 2000-307258 | 11/2000 |
| JP | 2002-116709 | 4/2002 |
| JP | 2002-189210 | 7/2002 |

(Continued)

*Primary Examiner* — Jerry Wu
(74) *Attorney, Agent, or Firm* — Hamre, Schumann, Mueller & Larson, P.C.

(57) ABSTRACT

A display device (100) comprising: a display panel (120); a middle frame (130) holding the display panel (120); and an upper frame (110) covering the display panel (120) from a display surface side. The middle frame (130) includes a placing portion (133) on which a peripheral portion of the display panel (120) is placed, the upper frame (110) includes a frame portion (115), which is disposed opposite to the peripheral portion of the display panel (120). A distance between the placing portion (133) and the frame portion (115), which are disposed opposite to each other on corner portions of the display panel (120), differs from a distance between the placing portion (133) and the frame portion (115), which are disposed opposite to each other on a central portion of the display panel (120).

10 Claims, 16 Drawing Sheets

(56) References Cited

FOREIGN PATENT DOCUMENTS

| | | |
|---|---|---|
| JP | 2002-229006 | 8/2002 |
| JP | 2003-149627 | 5/2003 |
| JP | 2008-242334 | 10/2008 |
| JP | 2009-053220 | 3/2009 |
| JP | 2009-176544 | 8/2009 |
| JP | 2014-085558 | 5/2014 |
| WO | 2010/073804 | 7/2010 |
| WO | 2014/046032 | 3/2014 |

* cited by examiner

DISPLAY DEVICE

CROSS-REFERENCE TO RELATED APPLICATION

This application is a bypass continuation of international patent application PCT/JP2014/005454, filed: Oct. 28, 2014 designating the United States of America, the entire disclosure of which is incorporated herein by reference.

TECHNICAL FIELD

The present disclosure relates to a display device and a frame constituting the display device.

BACKGROUND

A display device includes a display panel and a backlight disposed on a rear surface side of the display panel. The display device includes a lower frame accommodating a light source and an optical plate, which constitutes a backlight, a frame-like middle frame (also referred to as a mold frame) that is fixed to the lower frame with screws while holding a display panel, and a frame-like upper frame that is fixed to the lower frame or middle frame with screws while covering the display panel from a display surface side.

Recently, in the display device, there is known a problem in that a warp occurs due to heat generation associated with increase in size and high luminance and the display panel is brought into contact with another component. For example, WO 2010/073804 discloses a technique for solving the problem. In the technique of WO 2010/073804, a spacer is provided between a peripheral portion of the display panel and a peripheral portion of an optical member to separate the display panel from the optical member.

SUMMARY

However, in the technique of WO 2010/073804, when the warp occurs on a display surface side of the display panel, stress may concentrate on a part of a display surface of the display panel to lead to a display defect (such as color unevenness).

The present disclosure has been made in view of the above circumstances, and an object thereof is to provide a display device that can prevent display quality degradation due to stress concentration on a display surface of the display panel when a warp occurs in the display panel.

To solve the above problem, a display device according to the present disclosure comprises: a display panel; and a frame in which the display panel is accommodated, wherein the frame includes at least a frame-like first frame holding the display panel and a frame-like second frame covering the display panel from a display surface side, the display panel includes a peripheral portion outside of a display area, the peripheral portion including corner portions at four corners and a central portion located between the two corner portions adjacent to each other, the first frame includes a placing portion on which the peripheral portion of the display panel is placed, the second frame includes a frame portion, which is disposed opposite to the peripheral portion of the display panel, and a distance between the placing portion and the frame portion, which are disposed opposite to each other on a rear surface side and the display surface side in at least one of the corner portions of the display panel, differs from a distance between the placing portion and the frame portion, which are disposed opposite to each other on the rear surface side and the display surface side in the central portion of the display panel.

In the display device according to the present disclosure, the distance between the placing portion and the frame portion, which are disposed opposite to each other in at least one of the corner portions of the display panel, may be larger than the distance between the placing portion and the frame portion, which are disposed opposite to each other in the central portion on a long side of the display panel.

In the display device according to the present disclosure, the first frame may include a sidewall rising from a top surface of the placing portion to the display surface side, a height adjuster may be disposed on the display surface side of the sidewall in at least one of the corner portions of the display panel, and the second frame may be fixed to the first frame so that at least a part of a rear surface of the frame portion comes into contact with a top surface of the height adjuster.

In the display device according to the present disclosure, the height adjuster may be formed integrally with the sidewall in to top surface of the sidewall of the first frame.

In the display device according to the present disclosure, the first frame may include a sidewall rising from a top surface of the placing portion to the display surface side, a height adjuster formed integrally with the frame portion may be provided in a rear surface of the frame portion of the second frame in at least one of the corner portions of the display panel, and the second frame may be fixed to the first frame so that the height adjuster comes into contact with a top surface of the sidewall in at least one of the corner portions of the display panel.

In the display device according to the present disclosure, the height adjuster may be formed such that the distance between the placing portion and the frame portion increases continuously from the central portion of the display panel toward the corner portion.

In the display device according to the present disclosure, the height adjuster may be a spacer through which a screw used to fix the frame penetrates, screw holes in each of which the screw may be inserted from the display surface side are formed in each of the corner portions at the four corners and the central portion located between the two corner portions adjacent to each other in the frame portion of the second frame, the first frame and the second frame may be fixed to each other using screws with the spacer interposed therebetween in at least one of the corner portions of the display panel, and the first frame and the second frame may be fixed to each other using screws without the spacer interposed therebetween in the central portion of the display panel.

In the display device according to the present disclosure, the height adjuster may be a spacer through which a screw used to fix the frame penetrates, screw holes in each of which the screw may be inserted from the display surface side are formed in each of the corner portions at the four corners and the central portion located between the two corner portions adjacent to each other in the frame portion of the second frame, the first frame and the second frame may be fixed to each other using screws with the spacer interposed therebetween in at least one of the corner portions of the display panel and the central portion adjacent to the corner portion, and a thickness of the spacer disposed in at least one of the corner portions of the display panel may be smaller than a thickness of the spacer disposed in the central portion of the display panel.

In the frame portion of the second frame according to the present disclosure, a portion that is disposed opposite to the central portion on the long side of the display panel may be fixed to the first frame while being warped toward a side opposite to the display surface side.

In the display device according to the present disclosure, the display panel may include a first substrate on the display surface side and a second substrate on the rear surface side, the first substrate and the second substrate being disposed opposite to each other with a liquid crystal interposed therebetween, and the second substrate may include a plurality of gate lines, a plurality of data lines, a plurality of pixel electrodes each of which is disposed so as to correspond to each of a plurality of pixels formed in a row direction in which the gate line extends and a column direction in which the data line extends, and a common electrode corresponding to the plurality of pixel electrodes.

DETAILED DESCRIPTION

Hereinafter, an exemplary embodiment of the present disclosure will be described with reference to the drawings.

In the exemplary embodiment, a liquid crystal display device is described as an example of display device. However the present disclosure is not limited to the liquid crystal display device. For example the present disclosure may be an organic electroluminescence display (OLED) device.

First Exemplary Embodiment

Figure 1:
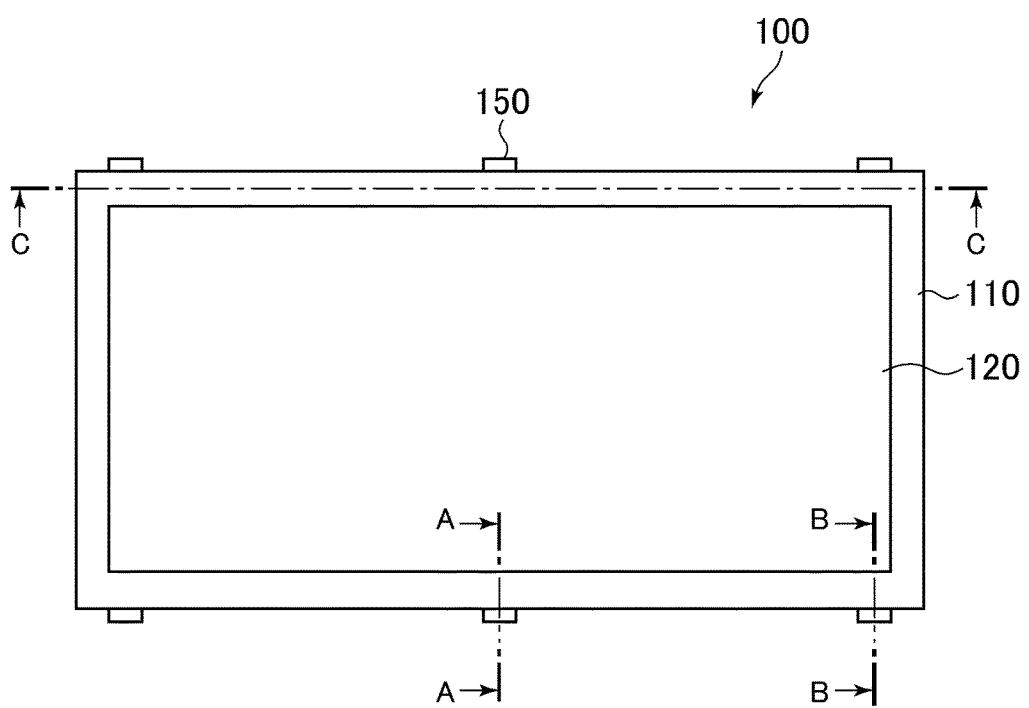
FIG. 1 is a plan view schematically illustrating an entire configuration of liquid crystal display device according to a first exemplary embodiment.
Figure 2:
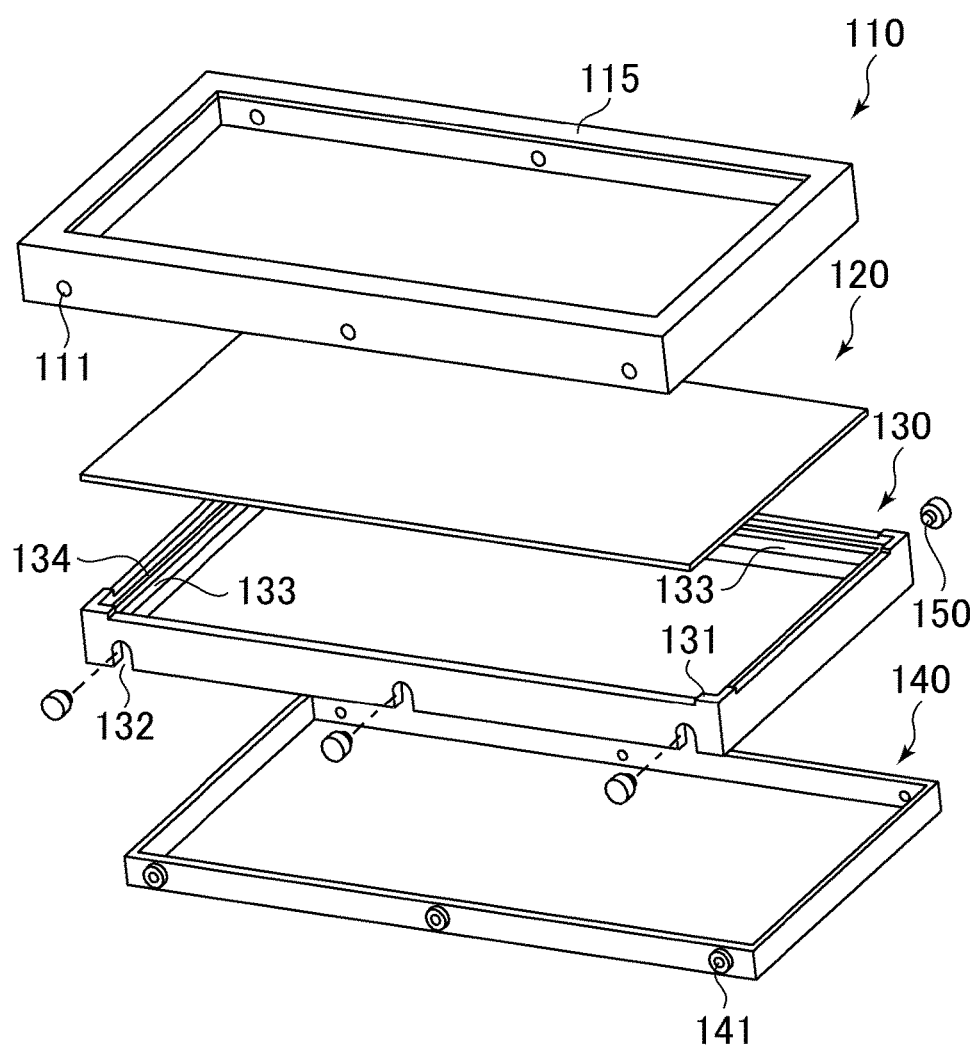
FIG. 2 is an exploded perspective view schematically illustrating main components of liquid crystal display device according to a first exemplary embodiment.

FIG. 1 is a plan view schematically illustrating an entire configuration of liquid crystal display device 100 according to a first exemplary embodiment. FIG. 2 is an exploded perspective view schematically illustrating main components of liquid crystal display device 100. Liquid crystal display device 100 mainly includes display panel 120 and a backlight (not illustrated) disposed on a rear surface side of display panel 120. Liquid crystal display device 100 includes lower frame 140 accommodating a light source, a diffuser, and an optical plate (which are not illustrated) constituting the backlight, frame-like middle frame 130 (first frame) that is fixed to lower frame 140 with screws 150 while holding display panel 120, and frame-like upper frame 110 (second frame) that is fixed to lower frame 140 with screws 150 while covering display panel 120 from a display surface side. Upper frame 110 may be fixed to middle frame 130 with screws.

Figure 3:
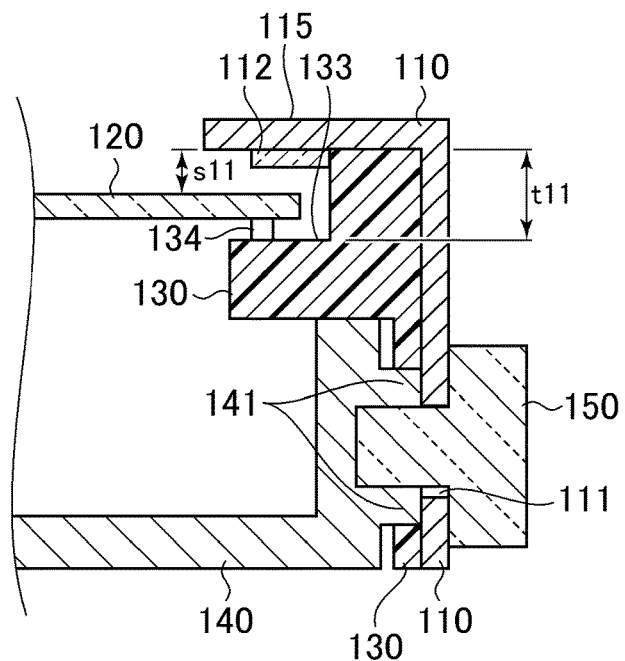
FIG. 3 is a sectional view taken along line A-A in FIG. 1.
Figure 4:
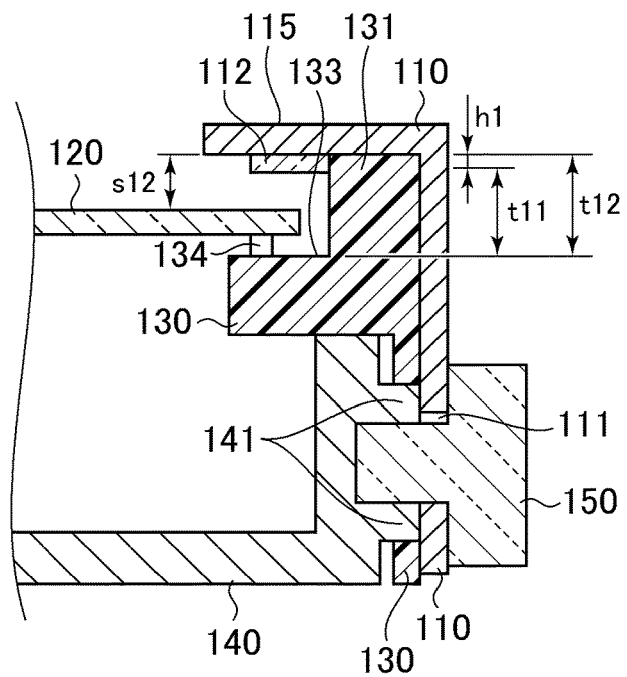
FIG. 4 is a sectional view taken along line B-B in FIG. 1.
Figure 5:
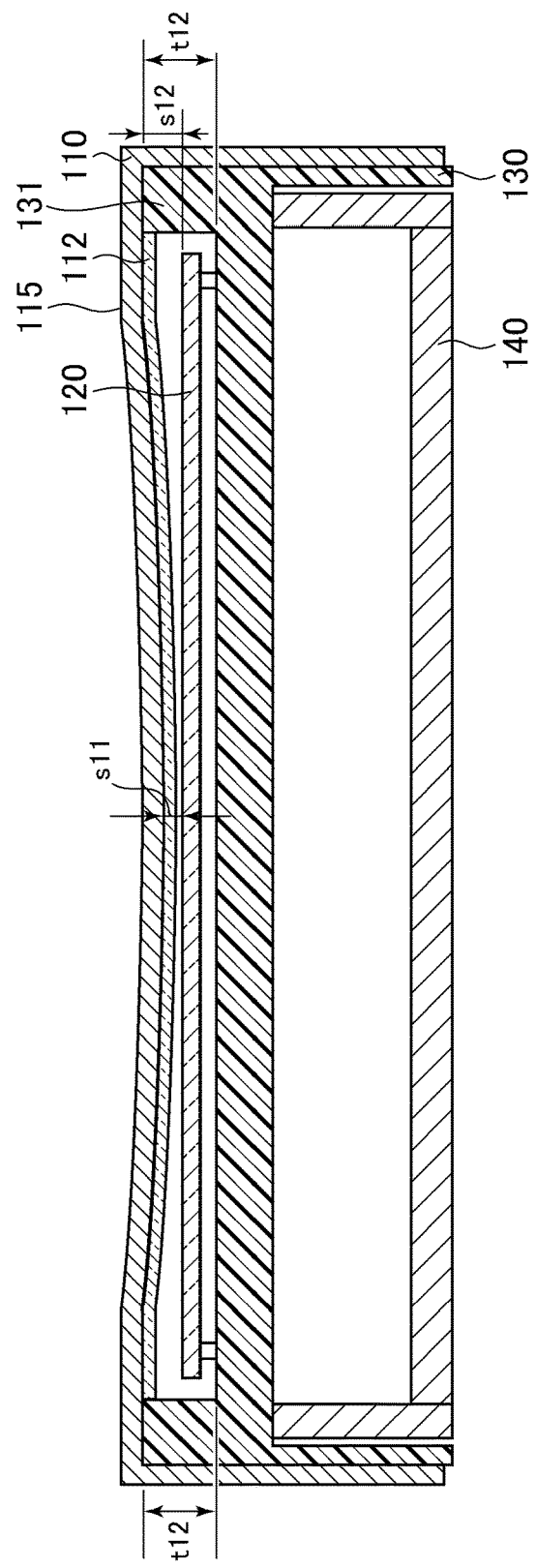
FIG. 5 is a sectional view taken along line C-C in FIG. 1.

FIG. 3 is a sectional view taken along line A-A in FIG. 1, FIG. 4 is a sectional view taken along line B-B in FIG. 1, and FIG. 5 is a sectional view taken along line C-C in FIG. 1. An outline of each component and a positional relationship between components will be described with reference to FIGS. 1 to 5.

Lower frame 140 is configured by a bottom plate on which the light source is disposed and a sidewall having a four-side frame shape extending in a thickness direction (hereinafter, referred to as a perpendicular direction) of display panel 120 from a peripheral end of the bottom plate. Three outwardly-projecting screw receivers 141 are formed on each of both sidewalls in a lengthwise direction (hereinafter, referred to as a crosswise direction) of lower frame 140. In screw receiver 141, a receiving portion is formed in order to receive screw 150, and a thread engaging with a thread of screw 150 is formed in an inner surface of the receiving portion. The light source, the diffuser, and the optical plate are disposed in lower frame 140.

Middle frame 130 is configured by a sidewall having a four-side frame shape extending in a perpendicular direction and placing portion 133. Placing portion 133 extends in an inside direction from each sidewall at a position below a top surface of each sidewall, and display panel 120 is placed on placing portion 133. In middle frame 130, insides of the sidewall and placing portion 133 are opened in the perpendicular direction, and middle frame 130 is formed into a frame shape. Projection 131 (height adjuster) projecting in the perpendicular direction (display surface side) is provided at each of four corners on the top surface of the sidewall of middle frame 130. As illustrated in FIGS. 2 and 4, projection 131 is formed such that the four corners of the sidewall project in the perpendicular direction. Projection 131 may be formed of a member different from the sidewall, and fixed to the top surface of the sidewall. Screw holes 132 are formed on the lower sides of both the sidewalls in the lengthwise direction of middle frame 130. Screw hole 132 receives screw receiver 141 of lower frame 140, and screw 150 is inserted in screw hole 132. As illustrated in FIG. 2, screw hole 132 is formed into a long hole shape extending in the perpendicular direction, and the lower side of screw hole 132 is opened. Elastic member 134 (cushion member)

is bonded to placing portion 133 using a double-sided tape. A foamed resin or a synthetic rubber is suitably used as a material for elastic member 134.

Middle frame 130 is fitted in lower frame 140 such that a rear surface of placing portion 133 comes into contact with the top surface of the sidewall of lower frame 140, and such that screw receiver 141 of lower frame 140 is received in screw hole 132.

Although not illustrated, display panel 120 includes a thin film transistor substrate (TFT substrate) (second substrate) disposed on the rear surface side, a color filter substrate (CF substrate) (first substrate) that is disposed on the display surface side to face the TFT substrate, and a liquid crystal layer sandwiched between the TFT substrate and the CF substrate. A plurality of gate lines, a plurality of data lines, a plurality of pixel electrodes that are disposed so as to correspond to the plurality of pixels formed in a row direction in which the gate line extends and a column direction in which the data line extends, and a common electrode corresponding to the plurality of pixel electrodes are formed in the TFT substrate. A driving circuit is provided in a frame area of display panel 120 in order to display an image. Display panel 120 is placed on placing portion 133 of middle frame 130 such that the rear surface of the peripheral portion comes into contact with elastic member 134 provided in middle frame 130. Therefore, display panel 120 is accommodated in middle frame 130.

Upper frame 110 is configured by a sidewall having a four-side frame shape extending in the perpendicular direction, frame portion 115 (bezel portion) extending in the inside direction (horizontal direction) from the top surface of each sidewall. A cross-section of upper frame 110 is formed into an L-shape. Elastic member 112 (cushion member) is bonded to the rear surface of frame portion 115 using a double-sided tape and the like in order to relieve an impact at the time of collision of display panel 120 with frame portion 115. A foamed resin or a synthetic rubber is suitably used as a material for elastic member 112. Screw holes 111 in which screws 150 are inserted are formed on the lower sides of both the sidewalls in the lengthwise direction of upper frame 110. Screw 150 is inserted in screw hole 111. Screw hole 111 is opened larger than a diameter of screw 150 by a predetermined width in at least the perpendicular direction. Therefore, upper frame 110 can be adjusted in the perpendicular direction by the predetermined width when fixed using screws. Screw hole 111 may be formed into a circular shape or an elliptical shape extending in the perpendicular direction. Three screw holes 111 are formed in each of both the sidewalls in the lengthwise direction of upper frame 110.

After upper frame 110 is disposed on lower frame 140 and middle frame 130 on which display panel 120 is placed so as to cover lower frame 140 and middle frame 130, screw 150 engages with screw receiver 141 of lower frame 140, whereby upper frame 110 is fixed to lower frame 140 and middle frame 130. There is no particular limitation to a position where the side surface of liquid crystal display device 100 is fixed using the screw and the number of screws.

At this point, because projections 131 are provided at the four corners of middle frame 130, the position where upper frame 110 is fixed in the perpendicular direction varies in each of portions (places) corresponding to a peripheral central portion and a corner portion (four corners) on a long side of display panel 120. That is, when upper frame 110 is placed on middle frame 130, frame portion 115 of upper frame 110 comes into contact with projection 131 of middle frame 130 as illustrated in FIG. 4 in the portion corresponding to the corner portion of display panel 120. Therefore, distance t12 from the top surface of placing portion 133 of middle frame 130 to the rear surface of frame portion 115 of upper frame 110 coincides with a distance from the top surface of placing portion 133 of middle frame 130 to the top surface of the sidewall. On the other hand, projection 131 is not provided on middle frame 130 in the portion corresponding to the peripheral central portion on the long side of display panel 120. Therefore, the distance from the top surface of placing portion 133 of middle frame 130 to the rear surface of frame portion 115 of upper frame 110 is larger than the distance from the top surface of placing portion 133 to the top surface of sidewall by a height (h1) of projection 131. In other words, when upper frame 110 is placed on middle frame 130, a gap of h1 is generated between the top surface of the sidewall of middle frame 130 and the rear surface of frame portion 115 of upper frame 110 in the portion corresponding to the peripheral central portion on the long side of display panel 120.

At this point, screw hole 111 of upper frame 110 is opened larger than the diameter of screw 150 by the predetermined width. When the predetermined width is set to h1 or more, upper frame 110 can be bent downward in the perpendicular direction by distance h1 in the central portion of upper frame 110. That is, in a process of manufacturing (assembling) liquid crystal display device 100, an operator places upper frame 110 on middle frame 130, and fixes upper frame 110 to middle frame 130 at six places using screws while pressing and bending the central portion on the long side of upper frame 110 toward the lower side in the perpendicular direction. For example, upper frame 110 is fixed to middle frame 130 after the rear surface of frame portion 115 in the central portion on the long side of upper frame 110 is bent downward in the perpendicular direction until the rear surface of frame portion 115 comes into contact with the top surface of the sidewall of middle frame 130. FIGS. 3 to 5 illustrate sectional structures in the fixed state. As illustrated in FIG. 3, frame portion 115 of upper frame 110 is fixed while making contact with the top surface of the sidewall of middle frame 130 in the portion corresponding to the peripheral central portion on the long side of display panel 120. Therefore, distance t11 from the top surface of placing portion 133 of middle frame 130 to the rear surface of frame portion 115 of upper frame 110 coincides with the distance from the top surface of placing portion 133 of middle frame 130 to the top surface of the sidewall. When display panel 120 is in an ideal state in which display panel 120 is not bent, the following relational expressions hold for the gap formed in the portion corresponding to the corner portions and the peripheral central portion of display panel 120. Note that s11 and s12 indicate distances from the top surface of display panel 120 to the rear surface of frame portion 115 of upper frame 110 in the peripheral central portion and the corner portion on the long side of display panel 120.

$$t12 > t11, s12 > s11$$

$$t12 - t11 = s12 - s11 = h1$$

In the above configuration, as illustrated in FIG. 5, the gap between display panel 120 and frame portion 115 of upper frame 110 can be taken largely in the four corners of display panel 120. Therefore, the stress concentration in frame portion 115 of upper frame 110 due to the deformation of display panel 120 can be avoided in the end portion (four corners) of display panel 120.

In the above configuration, all screw holes 111 are formed larger than the diameter of screw 150 by the predetermined width. However, the configuration of screw hole 111 is not limited thereto. For example, in the plurality of screw holes 111, only screw hole 111 in the portion corresponding to the peripheral central portion on the long side of display panel 120 may be formed larger than the diameter of screw 150 by the predetermined width, or only screw hole 111 in the portion corresponding to the peripheral end of display panel 120 may be formed larger than the diameter of screw 150 by the predetermined width.

All screw holes 111 may have an identical diameter (a diameter in which screw 150 can be inserted). In this configuration, when the central portion on the long side of upper frame 110 is pressed and bent downward in the perpendicular direction, upper frame 110 can be fixed using the screws while the center position of screw hole 111 coincides with the center position of screw receiver 141.

Second Exemplary Embodiment

Figure 6:
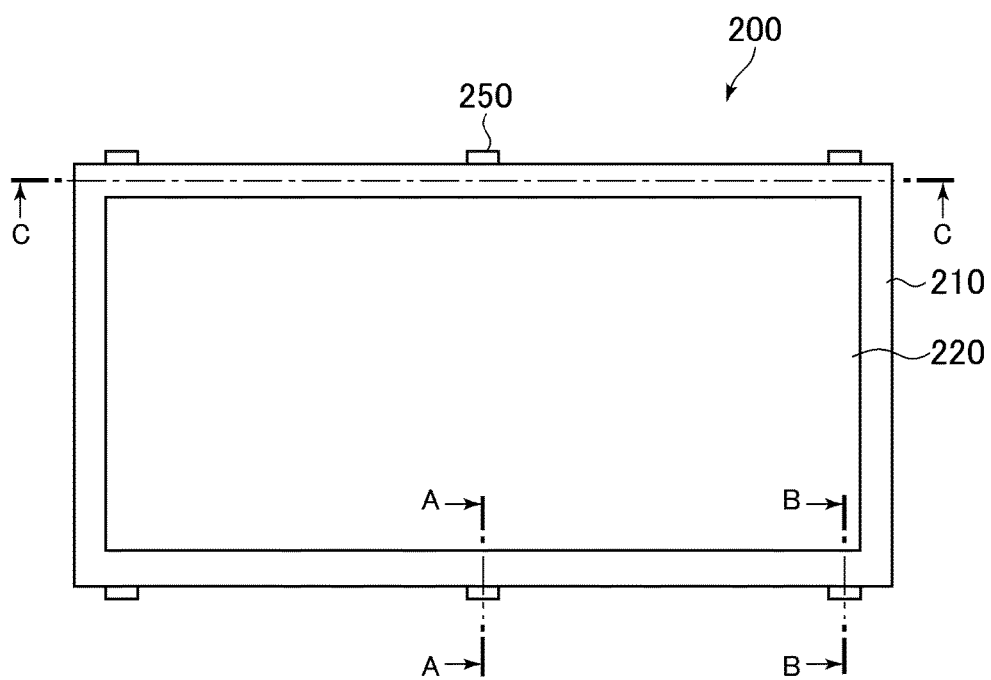
FIG. 6 is a plan view schematically illustrating an entire configuration of liquid crystal display device according to a second exemplary embodiment.
Figure 7:
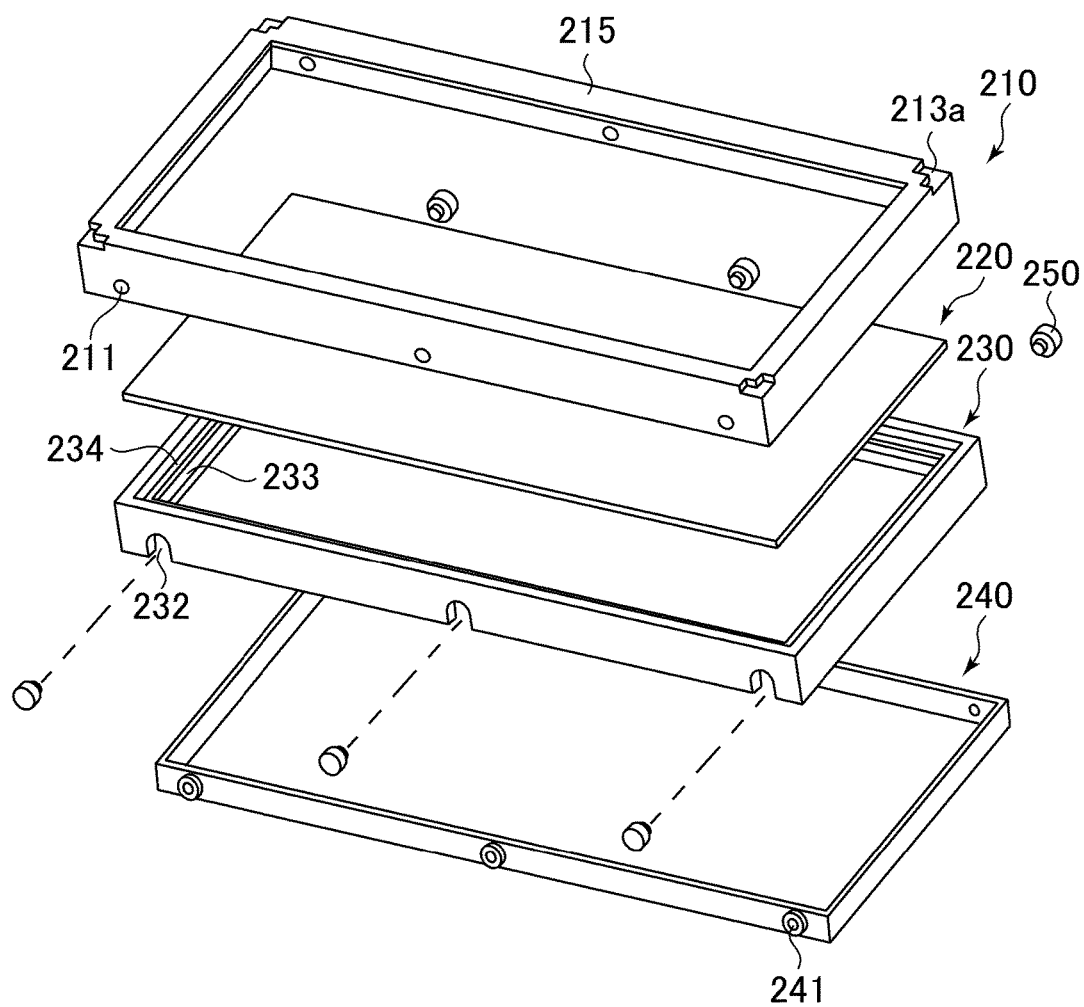
FIG. 7 is an exploded perspective view schematically illustrating main components of liquid crystal display device according to a second exemplary embodiment.

FIG. 6 is a plan view schematically illustrating an entire configuration of liquid crystal display device 200 according to a second exemplary embodiment. FIG. 7 is an exploded perspective view schematically illustrating main components of liquid crystal display device 200. Liquid crystal display device 200 mainly includes display panel 220 and a backlight (not illustrated) disposed on the rear surface side of display panel 220. Liquid crystal display device 200 includes lower frame 240 accommodating a light source, a diffuser, and an optical plate (which are not illustrated) constituting the backlight, frame-like middle frame 230 (first frame) that is fixed to lower frame 240 with screws 250 while holding display panel 220, and frame-like upper frame 210 (second frame) that is fixed to lower frame 240 with screws 250 while covering display panel 220 from the display surface side. Upper frame 210 may be fixed to middle frame 230 with screws.

Figure 8:
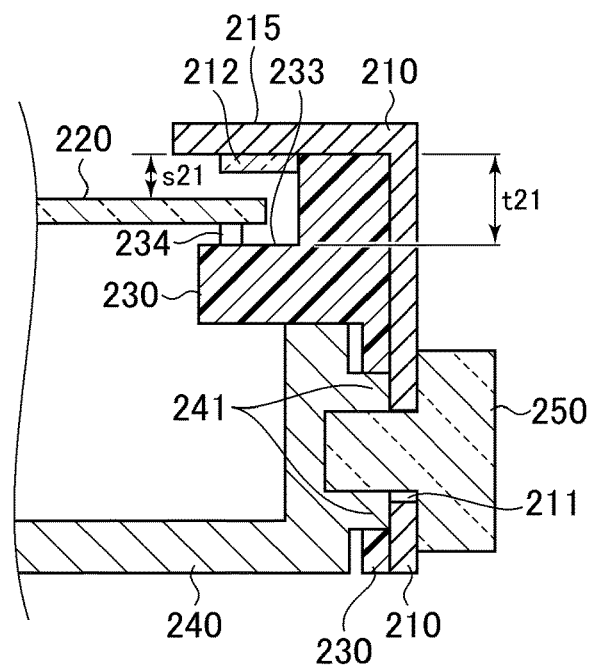
FIG. 8 is a sectional view taken along line A-A in FIG. 6.
Figure 9:
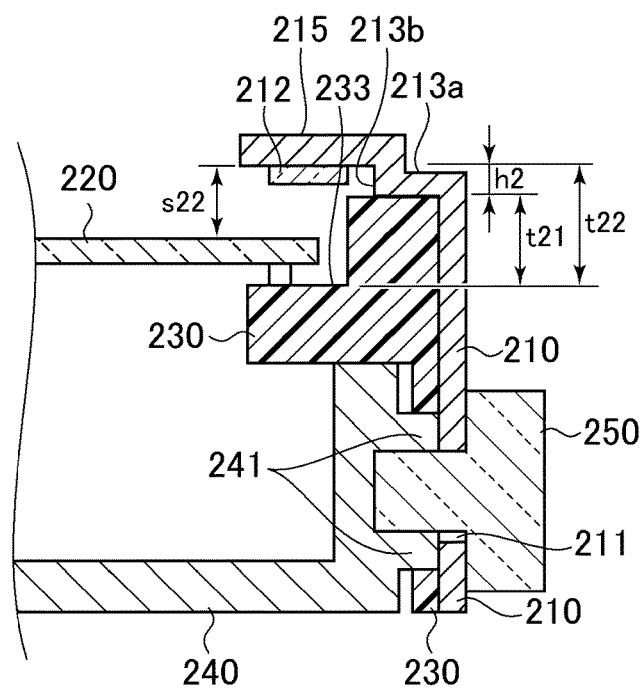
FIG. 9 is a sectional view taken along line B-B in FIG. 6.
Figure 10:
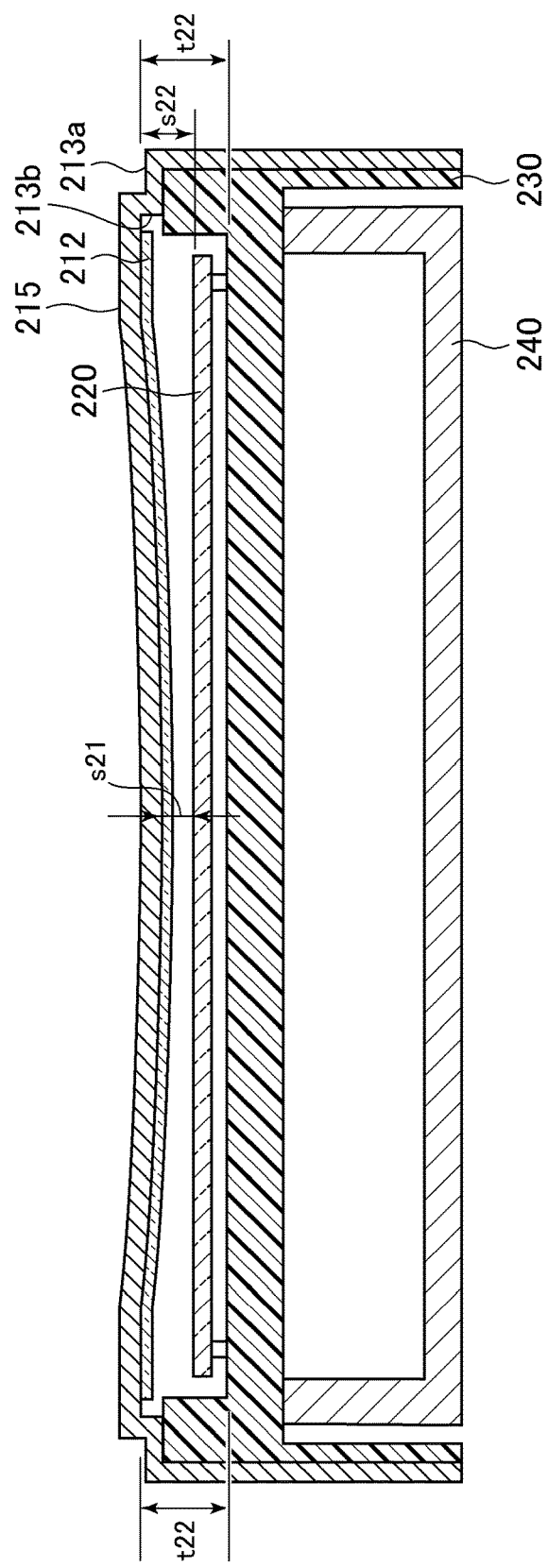
FIG. 10 is a sectional view taken along line C-C in FIG. 6.

FIG. 8 is a sectional view taken along line A-A in FIG. 6, FIG. 9 is a sectional view taken along line B-B in FIG. 6, and FIG. 10 is a sectional view taken along line C-C in FIG. 6. An outline of each component and a positional relationship between components will be described with reference to FIGS. 6 to 10. Because configurations of display panel 220 and lower frame 240 are identical to those of display panel 120 and lower frame 140 in the first exemplary embodiment, the description thereof is omitted. The description of the component having the same function as the component of the first exemplary embodiment is also omitted.

Middle frame 230 is identical to middle frame 130 of the first exemplary embodiment except that middle frame 230 does not include projection 131 of middle frame 130. That is, in middle frame 230, a distance (height) from the top surface of placing portion 233 to the top surface of the sidewall has an identical configuration in a whole periphery.

In upper frame 210, in addition to the configuration of upper frame 110 of the first exemplary embodiment, recess 213a is formed in the top surface at each of the four corners of frame portion 215, and protrusion 213b (height adjuster) is formed on a side opposite to the top surface (rear surface). Upper frame 210 may not include recess 213a and may include only protrusion 213b.

In the above configuration, because protrusions 213b are provided at the four corners of upper frame 210, similarly to the first exemplary embodiment, the position where upper frame 210 is fixed in the perpendicular direction varies in each of portions (places) corresponding to the peripheral central portion and the corner portion (four corners) on the long side of display panel 220. That is, when upper frame 210 is placed on middle frame 230, as illustrated in FIG. 9, protrusion 213b of frame portion 215 of upper frame 210 comes into contact with the top surface of the sidewall of middle frame 230 in the portion corresponding to the corner portion of display panel 220. On the other hand, in the portion corresponding to the peripheral central portion of display panel 220, because protrusion 213b is not formed in frame portion 215 of upper frame 210, a gap corresponding to a height (h2) of protrusion 213b is generated between the top surface of the sidewall of middle frame 230 and the rear surface of frame portion 215 of upper frame 210.

At this point, screw hole 211 of upper frame 210 is opened larger than the diameter of screw 250 by the predetermined width. When the predetermined width is set to h2 or more, upper frame 210 can be bent downward in the perpendicular direction by distance h2 in the central portion of upper frame 210. That is, in the process of manufacturing (assembling) liquid crystal display device 200, an operator places upper frame 210 on middle frame 230, and fixes upper frame 210 to middle frame 230 at six places using screws while pressing and bending the central portion on the long side of upper frame 210 toward the lower side in the perpendicular direction. For example, upper frame 210 is fixed to middle frame 230 after the rear surface of frame portion 215 in the central portion on the long side of upper frame 210 is bent downward in the perpendicular direction until the rear surface of frame portion 215 comes into contact with the top surface of the sidewall of middle frame 230. FIGS. 8 to 10 illustrate sectional structures in the fixed state. As illustrated in FIG. 8, frame portion 215 of upper frame 210 is fixed while making contact with the top surface of the sidewall of middle frame 230 in the portion corresponding to the peripheral central portion on the long side of display panel 220. Therefore, distance t21 from the top surface of placing portion 233 of middle frame 230 to the rear surface of frame portion 215 of upper frame 210 coincides with the distance from the top surface of placing portion 233 of middle frame 230 to the top surface of the sidewall. When display panel 220 is in an ideal state in which display panel 220 is not bent, the following relational expressions hold for the gap formed in the portion corresponding to the corner portions and the peripheral central portion of display panel 220. Note that s21 and s22 indicate distances from the top surface of display panel 220 to the rear surface of frame portion 215 of upper frame 210 in the peripheral central portion and the corner portion on the long side of display panel 220.

$$t22 > t21, s22 > s21$$

$$t22 - t21 = s22 - s21 = h2$$

In the above configuration, as illustrated in FIG. 10, the gap between display panel 220 and frame portion 215 of upper frame 210 can be taken largely in the four corners of display panel 220. Therefore, the stress concentration in frame portion 215 of upper frame 210 due to the deformation of display panel 220 can be avoided in the end portion (four corners) of display panel 220.

Third Exemplary Embodiment

Figure 11:
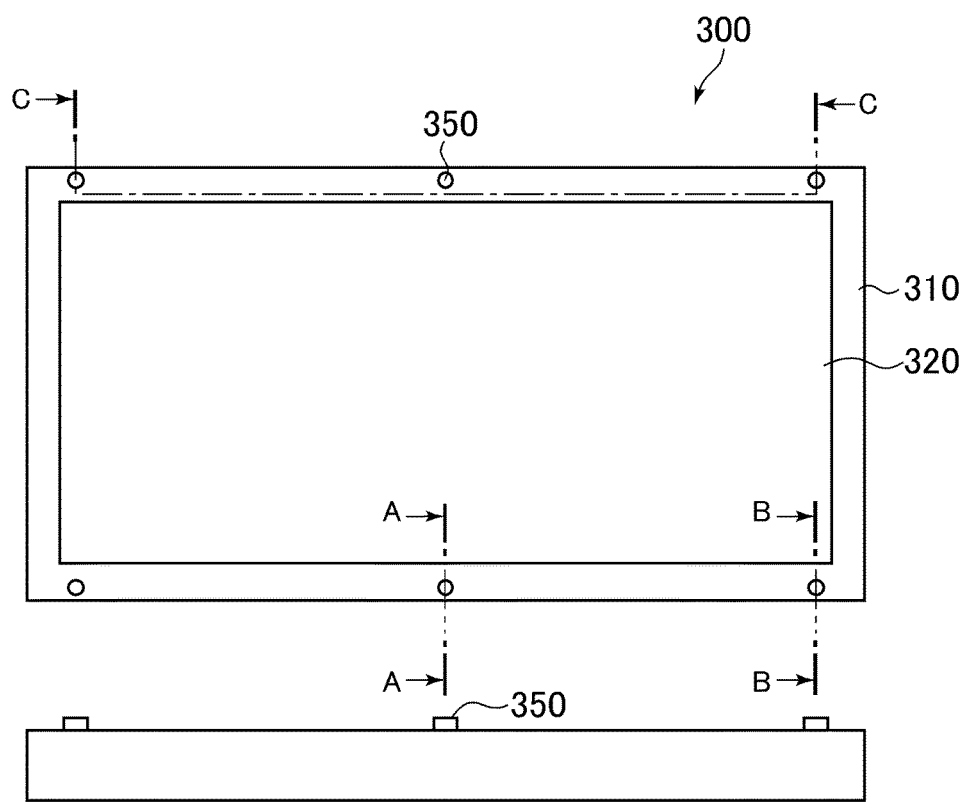
FIG. 11 is a plan view schematically illustrating an entire configuration of liquid crystal display device according to a third exemplary embodiment.
Figure 12:
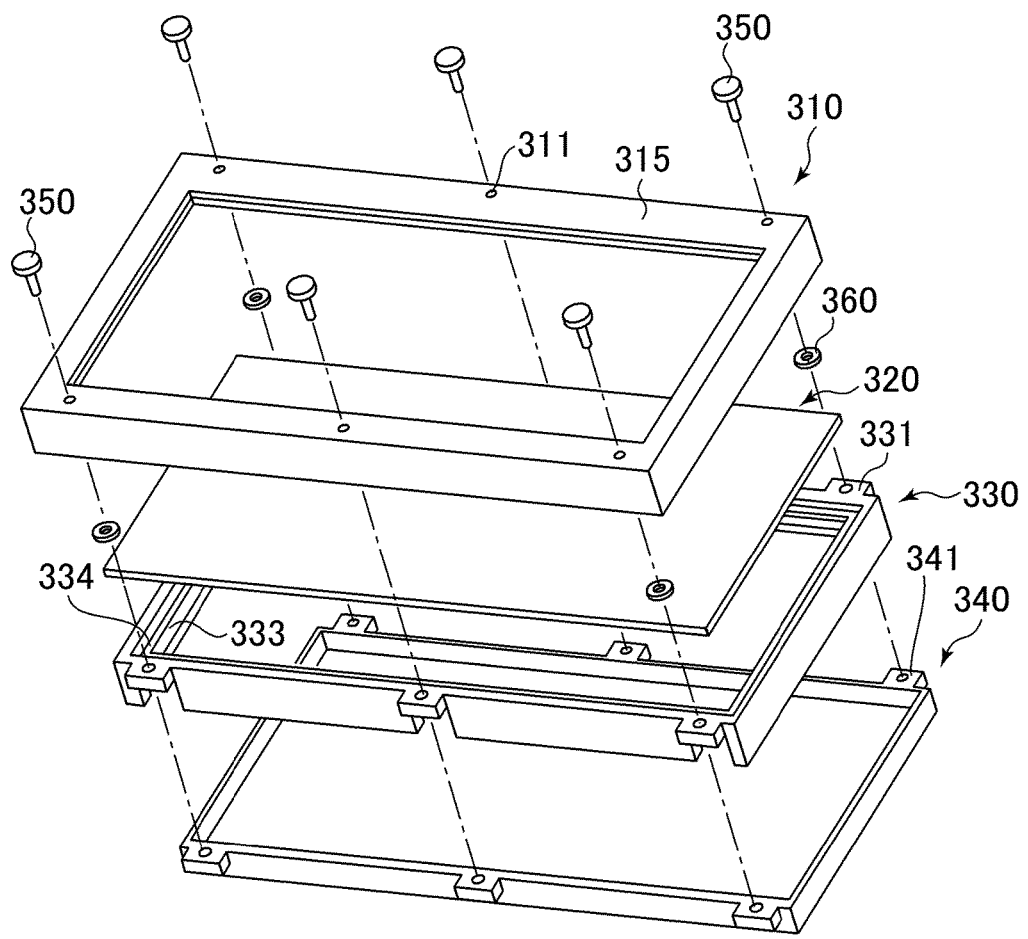
FIG. 12 is an exploded perspective view schematically illustrating main components of liquid crystal display device according to a third exemplary embodiment.

FIG. 11 is a plan view schematically illustrating an entire configuration of liquid crystal display device 300 according to a third exemplary embodiment. FIG. 12 is an exploded perspective view schematically illustrating main components of liquid crystal display device 300. Liquid crystal display device 300 mainly includes display panel 320 and a backlight (not illustrated) disposed on the rear surface side of display panel 320. Liquid crystal display device 300 includes lower frame 340 accommodating a light source, a diffuser, and an optical plate (which are not illustrated) constituting the backlight, frame-like middle frame 330 (first frame) that is fixed to lower frame 340 with screws 350 while holding display panel 320, and frame-like upper frame 310 (second frame) that is fixed to lower frame 340 with screws 350 while covering display panel 320 from the display surface side. Upper frame 310 may be fixed to middle frame 330 with screws.

Figure 13:
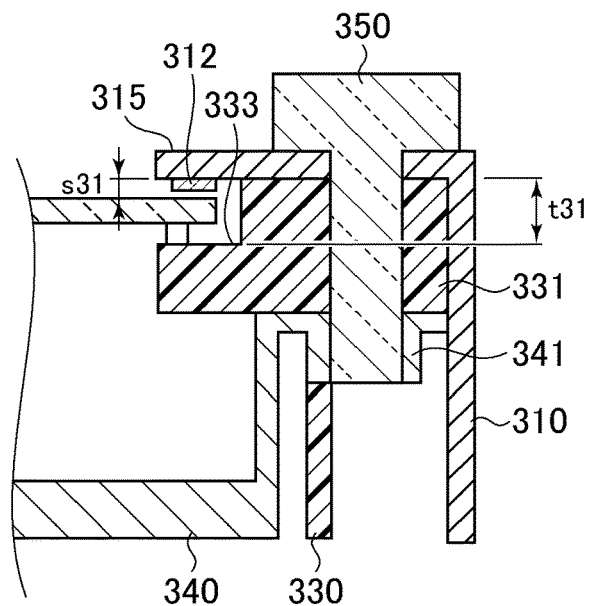
FIG. 13 is a sectional view taken along line A-A in FIG. 11.
Figure 14:
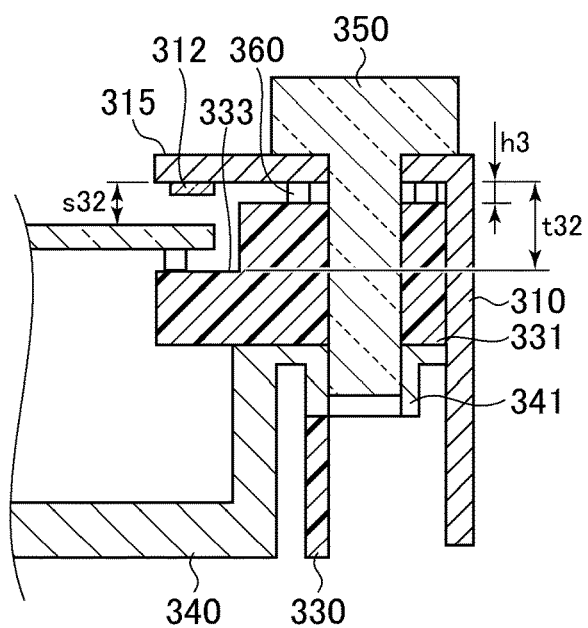
FIG. 14 is a sectional view taken along line B-B in FIG. 11.
Figure 15:
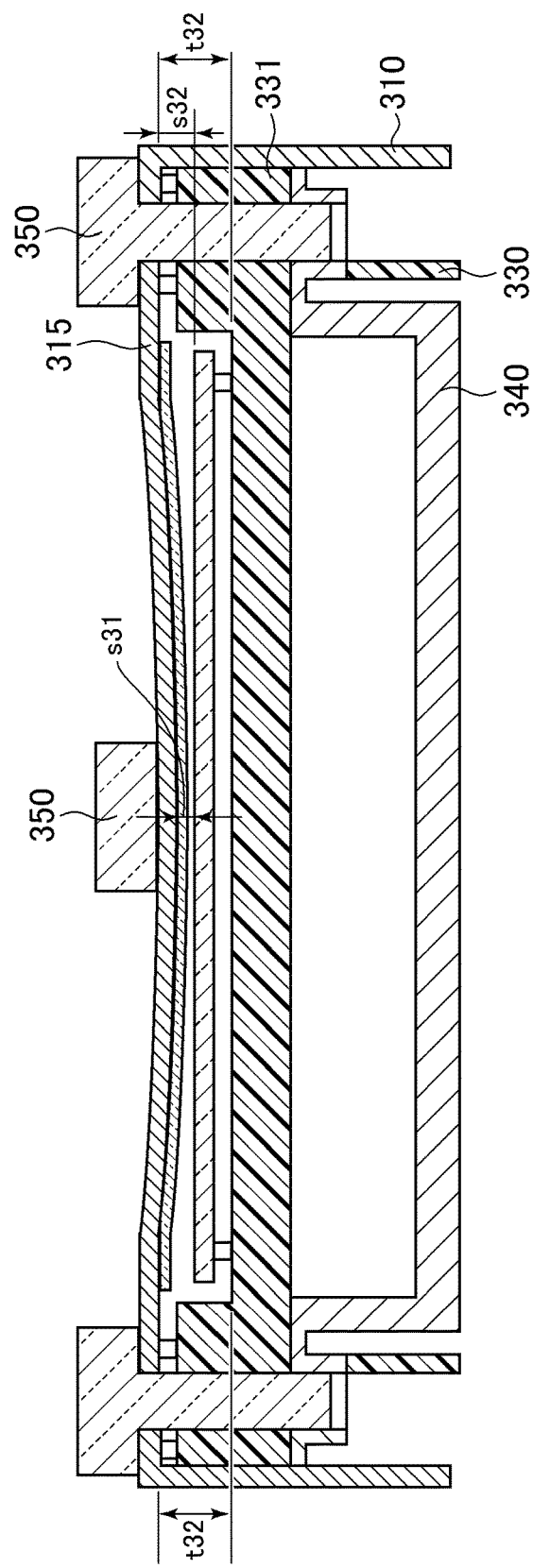
FIG. 15 is a sectional view taken along line C-C in FIG. 11.

FIG. 13 is a sectional view taken along line A-A in FIG. 11, FIG. 14 is a sectional view taken along line B-B in FIG. 11, and FIG. 15 is a sectional view taken along line C-C in FIG. 11. An outline of each component and a positional relationship between components will be described with reference to FIGS. 11 to 15. Because a configuration of display panel 320 is identical to that of display panel 120 in the first exemplary embodiment, the description thereof is omitted. The description of the component having the same function as the component of the first exemplary embodiment is also omitted.

Lower frame 340 is configured by a bottom plate on which the light source is disposed and a sidewall having a four-side frame shape extending in the perpendicular direction from the peripheral end of the bottom plate. Three screw receivers 341 projecting horizontally outward are formed on the top surface in each of both sidewalls in the lengthwise direction of lower frame 340. In screw receiver 341, a receiving portion is formed in order to receive screw 350 from the upper side in the perpendicular direction, and an internal thread engaging with a thread of screw 350 is formed in an inner surface of the receiving portion.

Middle frame 330 is configured by a sidewall having a four-side frame shape extending in a perpendicular direction and placing portion 333 extending in the inside direction from each sidewall at the position below the top surface of each sidewall. Three screw holes 331 projecting horizontally outward are formed on the top surface in each of both sidewalls in the lengthwise direction of middle frame 330.

The configuration of upper frame 310 is identical to that of upper frame 110 of the first exemplary embodiment except for the position of the screw hole. In upper frame 310, screw hole 311 is formed in the top surface of frame portion 315, and screw 350 is inserted from above in the perpendicular direction.

Additionally, in liquid crystal display device 300, spacer 360 (washer: height adjuster) is disposed between upper frame 310 and middle frame 330 in the portion corresponding to each of the four corners of display panel 320. Spacer 360 has thickness (height) h3. Spacer 360 has an opening in the central portion thereof, and the opening is larger than the diameter of screw 350. In a process of manufacturing (assembling) liquid crystal display device 300, an operator disposes spacer 360 between upper frame 310 and middle frame 330 in the corner portion (four corners), and inserts screw 350 from above in the perpendicular direction to fix screw 350 to screw receiver 341 of lower frame 340.

In the above configuration, because spacers 360 are disposed at the four corners of display panel 320, similarly to the first exemplary embodiment, the portions corresponding to the peripheral central portion and end portion (four corners) on the long side of display panel 320 differ from one another in the position where upper frame 310 is fixed. That is, when upper frame 310 is placed on middle frame 330, as illustrated in FIG. 14, spacer 360 is interposed between upper frame 310 and middle frame 330 in the portion corresponding to the end portion of display panel 320. On the other hand, in the portion corresponding to the peripheral central portion on the long side of display panel 320, because spacer 360 is not disposed, a gap corresponding to a height (h3) of spacer 360 is generated between the top surface of the sidewall of middle frame 330 and the rear surface of frame portion 315 of upper frame 310.

Therefore, upper frame 310 can be bent downward in the perpendicular direction by distance h3 in the central portion of upper frame 310. That is, in the process of manufacturing liquid crystal display device 300, an operator places upper frame 310 on middle frame 330, and fixes upper frame 310 to middle frame 330 at six places using screws while pressing and bending the central portion on the long side of upper frame 310 toward the lower side in the perpendicular direction. For example, upper frame 310 is fixed to middle frame 330 after the rear surface of frame portion 315 in the central portion on the long side of upper frame 310 is fastened using screw 350 and bent downward in the perpendicular direction until the rear surface of frame portion 315 comes into contact with the top surface of the sidewall of middle frame 330. FIGS. 13 to 15 illustrate sectional structures in the fixed state. As illustrated in FIG. 13, frame portion 315 of upper frame 310 is fixed while making contact with the top surface of the sidewall of middle frame 330 in the portion corresponding to the peripheral central portion on the long side of display panel 320. Therefore, distance t31 from the top surface of placing portion 333 of middle frame 330 to the rear surface of frame portion 315 of upper frame 310 coincides with the distance from the top surface of placing portion 333 of middle frame 330 to the top surface of the sidewall. When display panel 320 is in an ideal state in which display panel 320 is not bent, the following relational expressions hold for the gap formed in the portion corresponding to the corner portions and peripheral central portion of display panel 320. Note that s31 and s32 indicate distances from the top surface of display panel 320 to the rear surface of frame portion 315 of upper frame 310 in the peripheral central portion and the corner portion on the long side of display panel 320.

$t32>t31, s32>s31$ $t32-t31=s32-s31=h3$

In the above configuration, as illustrated in FIG. 15, the gap between display panel 320 and frame portion 315 of upper frame 310 can be taken largely in the four corners of display panel 320. Therefore, the stress concentration in frame portion 315 of upper frame 310 due to the deformation of display panel 320 can be avoided in the end portion (four corners) of display panel 320.

At this point, in liquid crystal display device 300 of the third exemplary embodiment, spacers 360 may be disposed in the portions corresponding to the four corners of display panel 320 and the portion corresponding to the peripheral central portion on the long side of display panel 320. In this configuration, thickness h31 of spacer 360 disposed in the portion corresponding to the peripheral central portion on the long side of display panel 320 is smaller than thickness h32 of spacer 360 disposed in the portion corresponding to each of the four corners of display panel 320 (h31<h32). Therefore, the gap between display panel 320 and frame portion 315 of upper frame 310 is taken largely at the four corners of display panel 320, so that the above effect can be obtained.

Fourth Exemplary Embodiment

Figure 16:
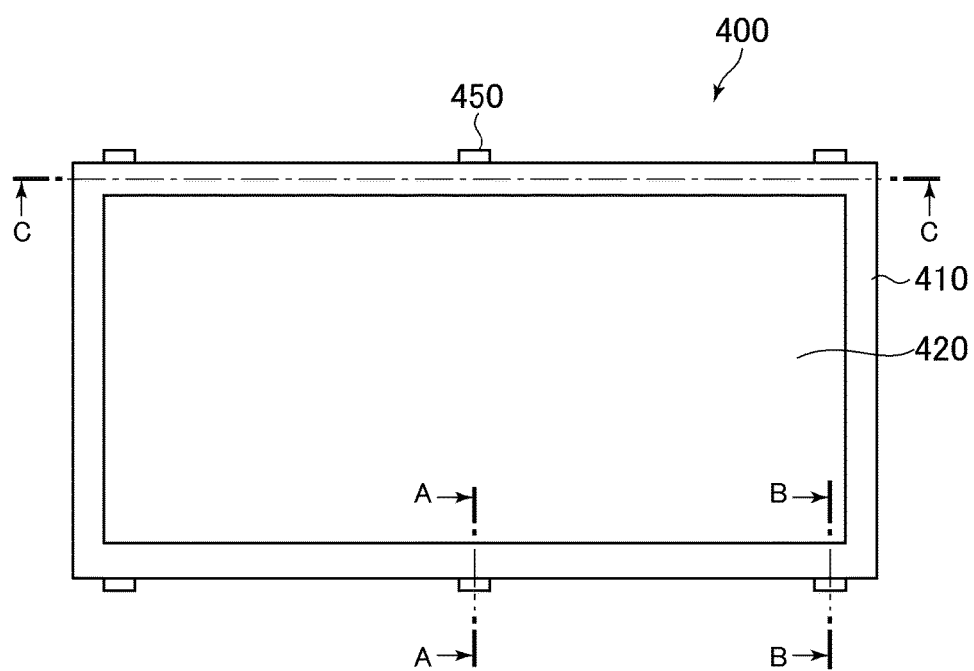
FIG. 16 is a plan view schematically illustrating an entire configuration of liquid crystal display device according to a fourth exemplary embodiment.
Figure 17:
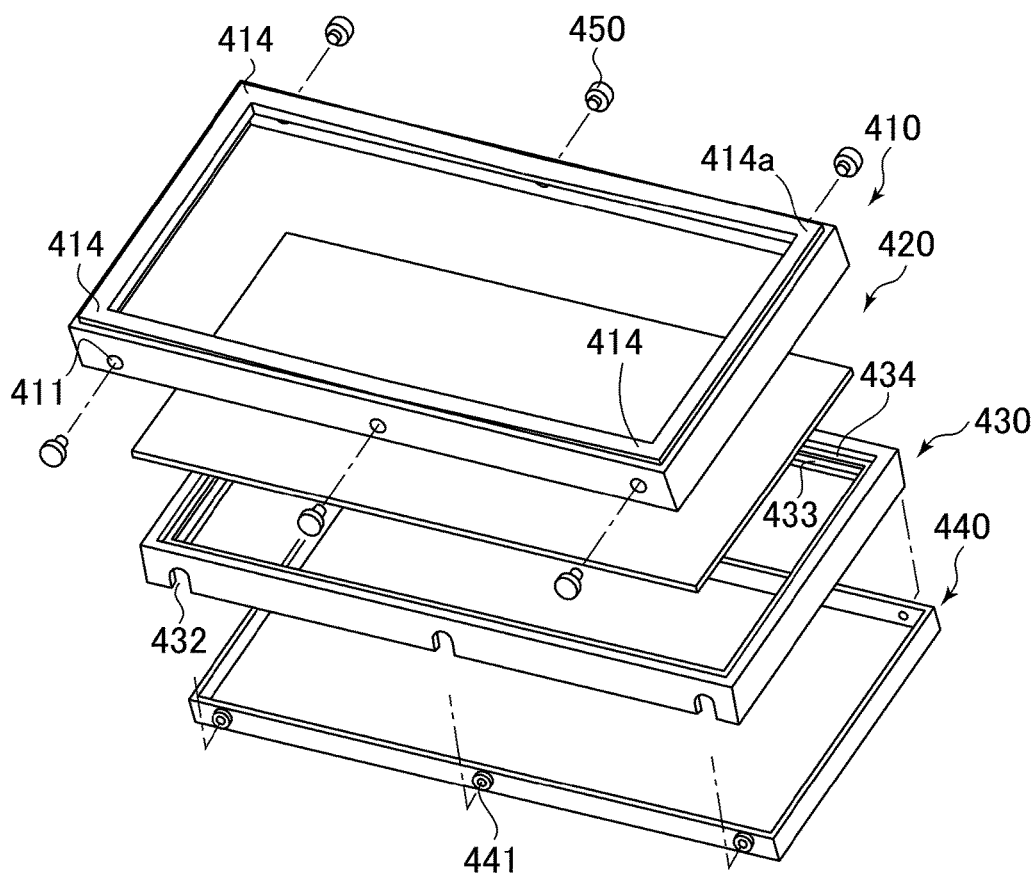
FIG. 17 is an exploded perspective view schematically illustrating main components of liquid crystal display device according to a fourth exemplary embodiment.

FIG. 16 is a plan view schematically illustrating an entire configuration of liquid crystal display device 400 according to a fourth exemplary embodiment. FIG. 17 is an exploded perspective view schematically illustrating main components of liquid crystal display device 400. Liquid crystal display device 400 mainly includes display panel 420 and a backlight (not illustrated) disposed on the rear surface side of display panel 420. Liquid crystal display device 400 includes lower frame 440 accommodating a light source, a diffuser, and an optical plate (which are not illustrated) constituting the backlight, frame-like middle frame 430 (first frame) that is fixed to lower frame 440 with screws 450 while holding display panel 420, and frame-like upper frame 410 (second frame) that is fixed to lower frame 440 with screws 450 while covering display panel 420 from the display surface side.

Figure 18:
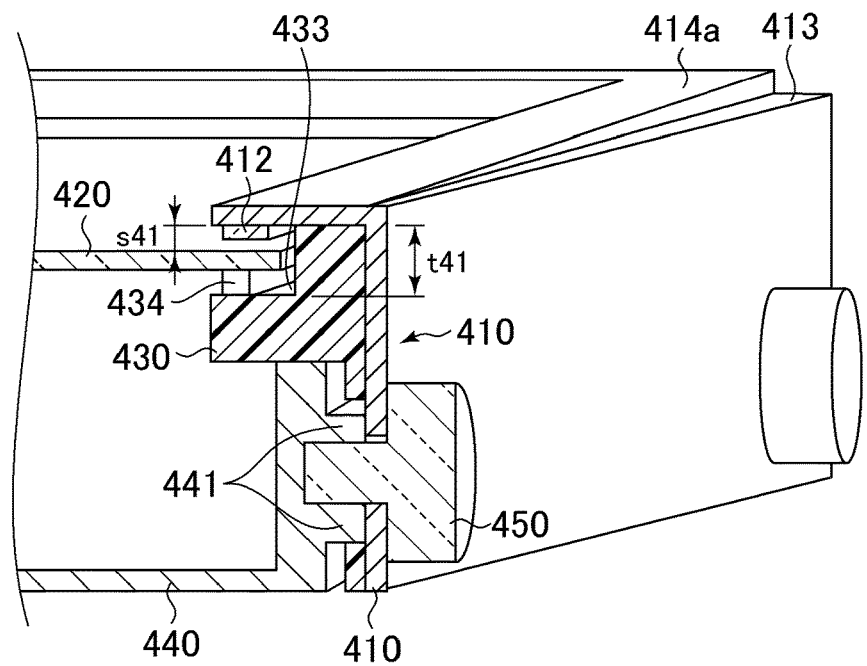
FIG. 18 is a sectional view taken along line A-A in FIG. 16.
Figure 19:
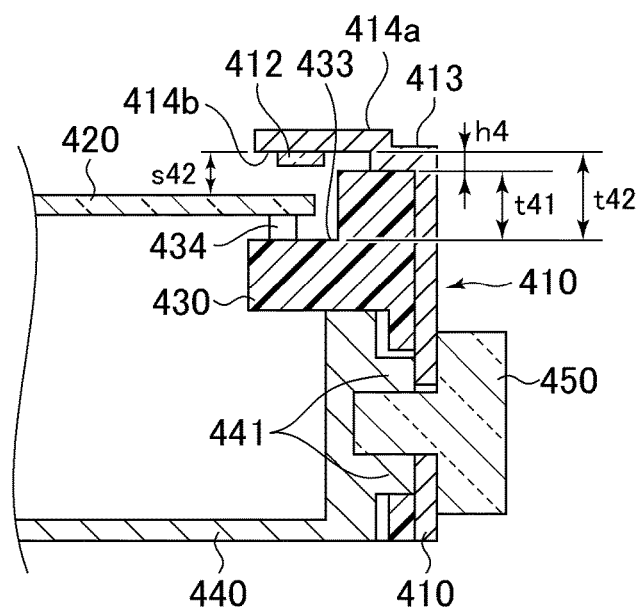
FIG. 19 is a sectional view taken along line B-B in FIG. 16.
Figure 20:
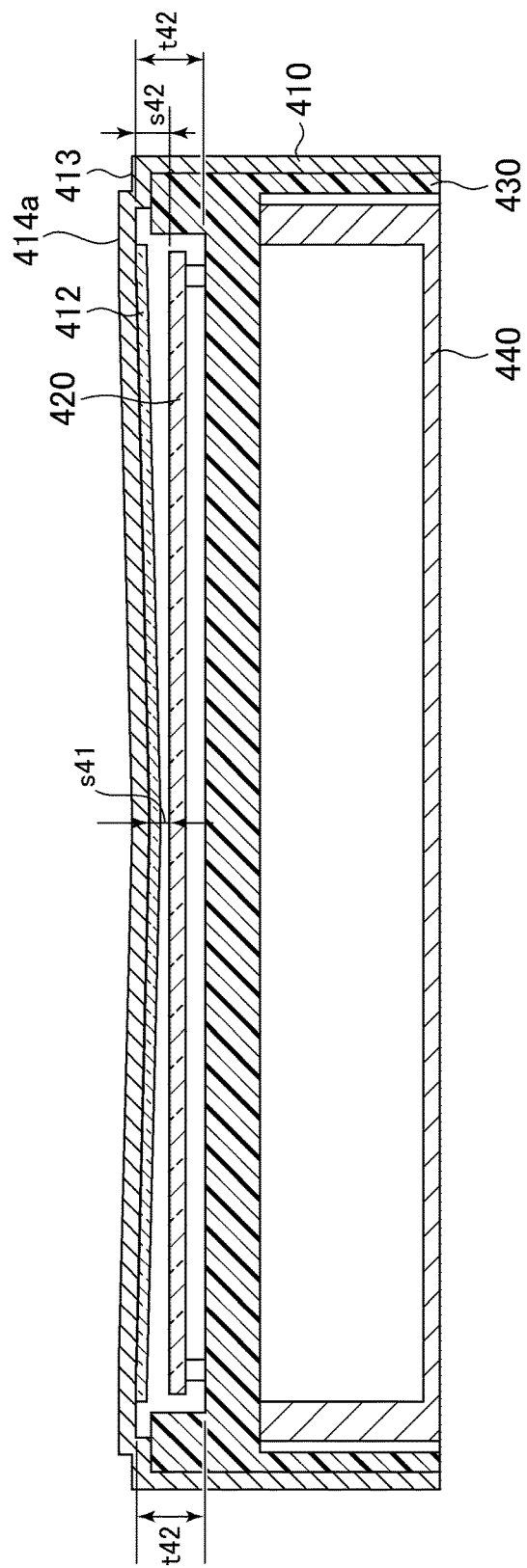
FIG. 20 is a sectional view taken along line C-C in FIG. 16.

FIG. 18 is a sectional view taken along line A-A in FIG. 16, FIG. 19 is a sectional view taken along line B-B in FIG. 16, and FIG. 20 is a sectional view taken along line C-C in FIG. 16. An outline of each component and a positional relationship between components will be described with reference to FIGS. 16 to 20. Because configurations of display panel 420 and lower frame 440 are identical to those of display panel 120 and lower frame 140 in the first exemplary embodiment, the description thereof is omitted. The description of the component having the same function as the component of the first exemplary embodiment is also omitted.

Middle frame 430 is identical to middle frame 130 of the first exemplary embodiment except that middle frame 430 does not include projection 131 of middle frame 130. That is, in middle frame 430, a distance (height) from the top surface of placing portion 433 to the top surface of the sidewall has an identical configuration in the whole periphery.

In upper frame 410, in addition to the configuration of upper frame 110 of the first exemplary embodiment, inclined protrusion 414a (height adjuster) is formed so as to rise from the central portion on the long side of the frame-portion top surface (flat portion 413) toward respective corner portion, and inclined recess 414b (height adjuster) is formed on the side (rear surface) opposite to inclined protrusion 414a. Upper frame 410 may not include inclined protrusion 414a, and may include only inclined recess 414b. In the top surface (surface) of the frame portion, inclined protrusion 414a has a shape that is inclined from the central portion toward the corner portion so as to rise continuously from flat portion 413 to the upper side (display surface side) in the perpendicular direction. On the other hand, inclined recess 414b has a shape that is inclined from the central portion toward the corner portion such that an internal space is enlarged continuously to the upper side (display surface side) in the perpendicular direction. Inclined protrusion 414a and inclined recess 414b may be formed into a linearly-inclined shape or a curvedly-inclined shape.

In the above configuration, the heights of inclined protrusion 414a and inclined recess 414b increase toward the four corners (end portions) of upper frame 410, and the portion corresponding to the peripheral central portion on the long side of display panel 420 differs from the corner portion (four corners) of display panel 420 in size of the gap (space) between display panel 420 and upper frame 410. In the portion corresponding to the peripheral central portion on the long side of display panel 420, inclined protrusion 414a and inclined recess 414b are not formed in the frame portion of upper frame 410 as illustrated in FIG. 18. Therefore, distance t41 from the top surface of placing portion 433 of middle frame 430 to the rear surface of the frame portion of upper frame 410 coincides with the distance from the top surface of placing portion 433 of middle frame 430 to the top surface of the sidewall. On the other hand, distance t42 from the top surface of placing portion 433 of middle frame 430 to the rear surface of the frame portion of upper frame 410 increases because the heights of inclined protrusion 414a and inclined recess 414b increase toward the end portion from the peripheral central portion on the long side of display panel 420 as illustrated in FIG. 19. When display panel 420 is in an ideal state in which display panel 420 is not bent, the following relational expressions hold for the gap formed in the portion corresponding to the corner portions and the peripheral central portion of display panel 420. Note that s41 and s42 indicate distances from the top surface of display panel 420 to the rear surface of the frame portion of upper frame 410 in the peripheral central portion and the corner portion on the long side of display panel 420, and h4 indicates a distance from the surface of inclined recess 414b to the rear surface of flat portion 413.

$t42 > t41, s42 > s41$ $t42 - t41 = s42 - s41 = h4$

In the above configuration, as illustrated in FIG. 20, the gap between display panel 420 and frame portion of upper frame 410 can be taken larger toward the four corners of display panel 420. Therefore, the stress concentration in frame portion of upper frame 410 due to the deformation of display panel 420 can be avoided in the end portion (four corners) of display panel 420. In the process of manufacturing liquid crystal display device 400, it is not necessary that upper frame 410 be fixed using the screws while the central portion of upper frame 410 is pressed and bent downward in the perpendicular direction.

As described above, in the configuration of the liquid crystal display device of each exemplary embodiment, the peripheral central portion on the long side of the display panel differs from the end portion (four corners) of the display panel in the spatial area facing the front surface in the peripheral portion of the display panel, particularly, the spatial area facing the end portion is wider than the spatial area facing the peripheral central portion. In the above configuration, the display panel is not forcedly fixed to prevent the deformation of the display panel, but the deformation is permitted at the four corners according to a characteristic of the display panel. Therefore, the display defect caused by the stress concentration on the display panel can be prevented. The gap between the display panel and the upper frame is not uniformly enlarged, but the gap is enlarged in at least the four corners. Therefore, a low profile of the liquid crystal display device is not inhibited, and a foreign matter is not easily mixed.

In the configurations of the first to third exemplary embodiments, the upper frame is fixed using the screws while being bent (warped) (see FIGS. 5, 10, and 15). However, the configuration of the upper frame is not limited thereto. For example, the upper frame may previously be formed such that an amount of downward bending in the perpendicular direction increases from the four corners toward the peripheral central portion. In this case, the maximum bending amount in the peripheral central portion of the upper frame may be set to the predetermined width.

In the configuration of the liquid crystal display device of each exemplary embodiment, the distance between the placing portion of the middle frame and the frame portion of the upper frame, which are disposed opposite to each other in at least one corner portion of the display panel, is larger than the distance between the placing portion of the middle frame and the frame portion of the upper frame, which are disposed opposite to each other in the central portion on the long side of the display panel. However, the liquid crystal display device is not limited thereto. For example, the distance between the placing portion of the middle frame and the frame portion of the upper frame, which are disposed opposite to each other in the central portion on the long side of the display panel, may be larger than the distance between the placing portion of the middle frame and the frame portion of the upper frame, which are disposed opposite to each other in the corner portion of the display panel. This configuration is suitable for the liquid crystal display device having a characteristic in which a support point where the display panel is held is set to the end portion side while the central portion of the display panel is warped toward the rear surface side or the display surface side. Thus, in the liquid crystal display device, the distance (gap) on the corner portion side and the distance (gap) on the central portion side may be adjusted according to the characteristic (such as a size and a placing method) of the display panel.

As described above, the liquid crystal display device has the configuration in which the distance between the placing portion and frame portion, which are disposed opposite to each other on the rear surface side and the display surface side in at least one corner portion of the display panel, differs from the distance between the placing portion and the frame portion, which are disposed opposite to each other on the rear surface side and the display surface side in the central portion of the display panel.

In the liquid crystal display device of each exemplary embodiment described above, the central portion differs from the end portion in the spatial area on the long side of the display panel. Similarly, the central portion may differ from the end portion in the spatial area on the short side of the display panel.

Additionally, in the above configuration, the spatial area can be formed in the front surface of the peripheral portion of the display panel. Therefore, the liquid crystal display device of each exemplary embodiment is suitable for a liquid crystal display device having an In-Plane Switching (IPS) scheme. The liquid crystal display device having the IPS scheme includes the pixel electrode and the common electrode in each pixel area on the liquid crystal side in one of the pair of substrates, which are disposed opposite to each other with the liquid crystal interposed therebetween. In the configuration, an electric field (horizontal field) parallel to the substrate is generated between the pixel electrode and the common electrode, the horizontal field is applied to the liquid crystal to drive the liquid crystal, whereby a quantity of light transmitted through an area between the pixel electrode and the common electrode is adjusted to display the image.

In the above, the specific embodiments of the present application have been described, but the present application is not limited to the above-mentioned embodiments, and various modifications may be made as appropriate without departing from the spirit of the present application.

What is claimed is:

1. A display device, comprising:
a display panel; and
a frame in which the display panel is accommodated, wherein the frame includes at least:
a first frame holding the display panel,
a second frame covering the display panel from a display surface side, and
a third frame accommodating a light source and disposed further away from the display surface side than the second frame,
the display panel includes a peripheral portion outside of a display area, the peripheral portion including corner portions at four corners and a central portion located between two of the corner portions adjacent to each other,
the first frame includes a placing portion on which the peripheral portion of the display panel is placed,
the second frame includes a frame portion, which is disposed opposite to the peripheral portion of the display panel, and a sidewall extending from a rear surface of the frame portion toward a side opposite to the display surface side, and
a distance between the placing portion and the frame portion disposed opposite to each other in at least one of the corner portions of the display panel is larger than a distance between the placing portion and the frame portion disposed opposite to each other in the central portion of the display panel,
wherein in the sidewall of the second frame, a portion that is disposed opposite to the central portion on a long side of the display panel is fixed to the third frame via screw so as to be warped toward a side opposite to the display surface side.

2. The display device according to claim 1, wherein
the first frame includes a sidewall rising from a top surface of the placing portion toward the display surface side,
a height adjuster is disposed on the display surface side of the sidewall of the first frame in at least one of the corner portions of the display panel, and
the second frame is fixed to the first frame so that at least a part of the rear surface of the frame portion comes into contact with a top surface of the height adjuster, and
a total height of the sidewall and the height adjuster in the corner portions being greater than the sidewall in the central portion.

3. The display device according to claim 2, wherein the height adjuster is formed integrally with the sidewall in a top surface of the sidewall of the first frame.

4. The display device according to claim 1, wherein
the first frame includes a sidewall rising from a top surface of the placing portion toward the display surface side,
a height adjuster formed integrally with the frame portion is provided in the rear surface of the frame portion of the second frame in at least one of the corner portions of the display panel, and
the second frame is fixed to the first frame so that the height adjuster comes into contact with a top surface of the sidewall in at least one of the corner portions of the display panel.

5. The display device according to claim 4, wherein the height adjuster is formed such that the distance between the placing portion and the frame portion increases continuously from the central portion of the display panel toward the corner portions.

6. The display device according to claim 2, wherein
the height adjuster is a spacer through which a screw used to fix the frame penetrates,
screw holes in each of which the screw is inserted from the display surface side are formed in each of the corner portions at the four corners and the central portion located between the two corner portions adjacent to each other in the frame portion of the second frame, the first frame and the second frame are fixed to each other using screws with the spacer interposed therebetween in at least one of the corner portions of the display panel, and the first frame and the second frame are fixed to each other using screws without the spacer interposed therebetween in the central portion of the display panel.

7. The display device according to claim 2, wherein the height adjuster is a spacer through which a screw used to fix the frame penetrates, screw holes in each of which the screw is inserted from the display surface side are formed in each of the corner portions at the four corners and the central portion located between the two corner portions adjacent to each other in the frame portion of the second frame, the first frame and the second frame are fixed to each other using screws with the spacer interposed therebetween in at least one of the corner portions of the display panel and the central portion adjacent to the corner portion, and a thickness of the spacer disposed in at least one of the corner portions of the display panel is smaller than a thickness of the spacer disposed in the central portion of the display panel.

8. The display device according to claim 2, wherein the display panel includes a first substrate on the display surface side and a second substrate on the rear surface side, the first substrate and the second substrate being disposed opposite to each other with a liquid crystal interposed therebetween, and the second substrate includes a plurality of gate lines, a plurality of data lines, and a plurality of pixel electrodes, each of which is disposed so as to correspond to each of a plurality of pixels formed in a row direction in which the gate lines extend and a column direction in which the data lines extend, and a common electrode corresponding to the plurality of pixel electrodes.

9. The display device according to claim 1, wherein a screw hole into which the screw is inserted is formed on the sidewall of the second frame, and a diameter of the screw hole is larger than a diameter of the screw in a direction perpendicular to the display surface side.

10. The display device according to claim 9, wherein the third frame includes a screw receiver projecting outwardly and receiving the screw, another screw hole is formed on the first frame, and the screw receiver is inserted into the another screw hole.

* * * * *